Jan. 11, 1938.   R. N. BRICKNER   2,105,308
MOMENTUM ACTUATED SLED BRAKE
Filed Dec. 9, 1935   2 Sheets-Sheet 1

INVENTOR.
Robert N. Brickner

Jan. 11, 1938.  R. N. BRICKNER  2,105,308
MOMENTUM ACTUATED SLED BRAKE
Filed Dec. 9, 1935  2 Sheets-Sheet 2

INVENTOR.
Robert N. Brickner

Patented Jan. 11, 1938

2,105,308

UNITED STATES PATENT OFFICE 2,105,308

MOMENTUM ACTUATED SLED BRAKE

Robert N. Brickner, New York, N. Y.

Application December 9, 1935, Serial No. 53,526

15 Claims. (Cl. 188—8)

This invention relates to an improved sled and its leading object is to provide a sled with a brake, which is manually released from a normally inactive position to a road engaging position, and which will be forced rearwardly by the tractive resistance offered against the momentum of the sled, and which will lift the runners of the sled out of engagement with the road, and effectively and safely brake the forward movement of the sled, in a relatively short period of time.

Another object of the invention is to provide a sled of this type with a brake having a ground engaging member which has gradual engagement with the road, from its rear end forwardly, to prevent the sled being upset when traveling at high speed.

A still further object of the invention is the provision of a sled with a brake, which includes a retarding skid having cleats or obstacle members thereon, links for pivotally supporting the skid on the body of the sled, and means for swinging the skid from raised position to road engaging position, which is operated by manual effort of the rider, so that the skid will be forced rearwardly by the action of the moving sled, and the force of this motion will be utilized to raise the runners of the sled above the ground, and the sled will be entirely supported by the skid.

With the above and other objects in view the invention consists in certain new and useful constructions, combinations, and arrangements of parts, clearly described in the following specifications, and fully illustrated in the accompanying drawings, in which:—

Figure 1:
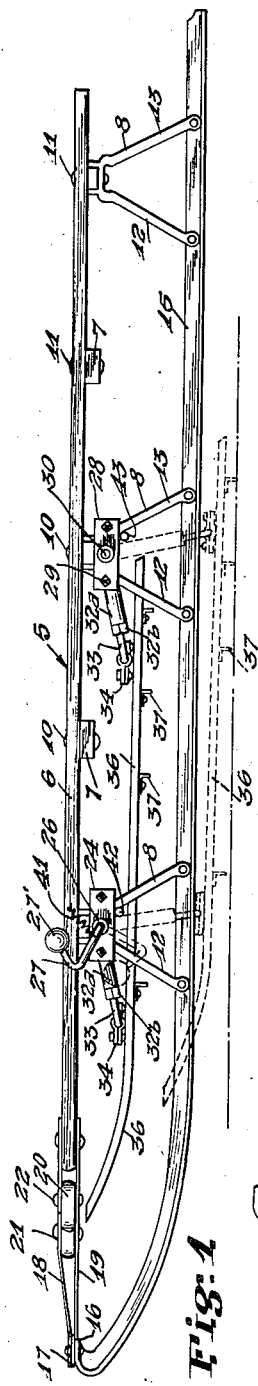
Fig. 1 is a side view of the improved sled, showing the brake in full lines in its normally raised position, and in dotted lines in its lowered position.
Figure 2:
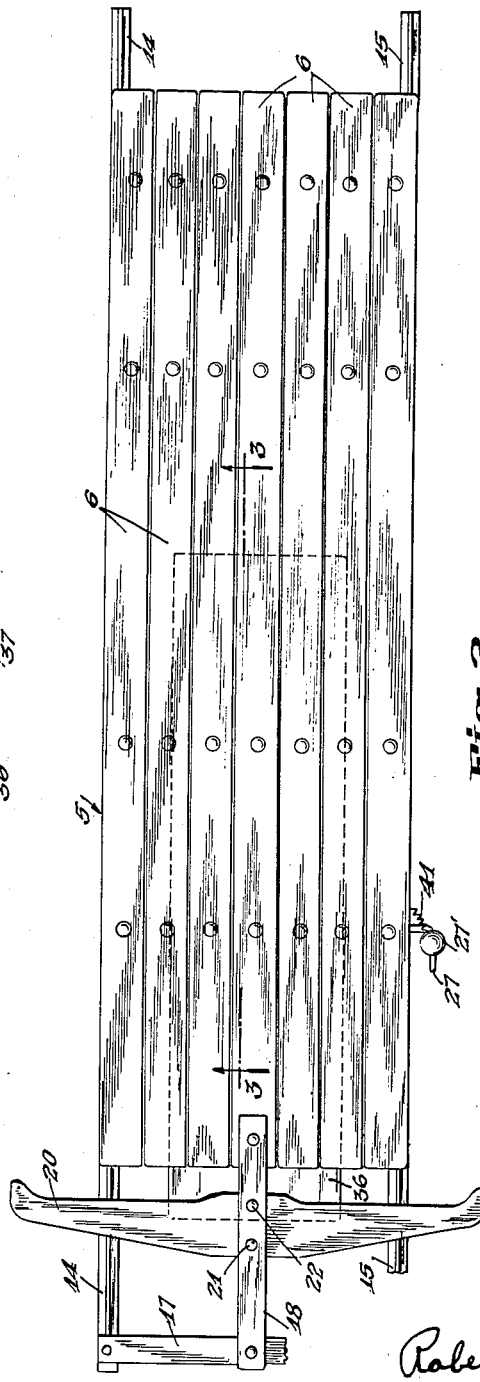
Fig. 2 is a plan view thereof, with minor parts broken away for convenience.

Referring to the drawings illustrating the practical embodiment of the invention 5 designates the deck or body of the sled, which is shown to consist of the longitudinal frame bars 6, and cross connecting frame bars 7. To the frame or body 5 the bracket members 8 and 9 are secured by the bolts 10 and 11, and each of these brackets includes legs 12 and 13, which diverge downwardly. The brackets are arranged in pairs, which are spaced longitudinally from each other, and three such pairs of brackets are shown. The bracket members 8 belong to the left pairs, looking rearwardly from the forward end of the sled and the brackets 9 belong to the right members of these pairs.

The divergent legs 12 and 13 of the left bracket members are fastened directly to the left sled runner 14, and the divergent legs 12 and 13 of the right bracket members are fastened directly to the right sled runner 15. These sled runners are preferably formed of T-shaped steel sections. The forward end of each runner is curved upwardly and bent or shaped backwardly at 16, and to the opposing forward ends of the runners the cross steering bar 17 is pivoted.

To the cross steering bar or member 17 the link bars 18 and 19 are pivoted at their forward ends, and the rear ends of these bars are pivoted to the forward end of the body frame. A lever 20 is placed between these link bars and bolted at 21 and 22 thereto. This lever extends across the forward end of the sled frame or body to enable the rider to bend the runners to steer the sled, and thus control the direction of turning.

On the forward pair of bracket members bearing members 23 and 24 are strapped or clamped in place, as by means of the hook bolts 25. A cross shaft 26 is mounted to turn in these bearing members, and on one end is equipped with an L-shaped crank handle 27, which may be provided with a ball-shaped hand hold 27', which extends to a position just above the top plane of the sled body. This crank handle may be formed on the end of the cross shaft.

On the intermediate bracket members a similar pair of opposed bearing members 28 are secured in place by means of the strap bolts 29. A second cross shaft 30 is mounted to turn in these bearing members 28.

To the forward cross shaft 26 the bifurcated hangers 31 and 32 are fixed. These hangers are spaced apart and are formed with sockets which receive the angular or vertical arms 31a and 32a of the cross U-shaped shaft 33. Nuts 31b and 32b are threaded on these vertical arms against the hangers, and provide at the same time a coupling and an adjusting means between the cross shaft 33 and the cross shaft 26.

The cross shaft 33 is strapped by means of the clamp plates or straps 34 and 35 to the metal skid 36, the side marginal edge portions of which are formed with upturned flanges 36a. The side marginal edge portions also provide skid runners 36b, and between these skid runners obstacle cleats or angle members 37 are bolted in place, so that the maximum frictional resistance to sliding movement is obtained, all of such cleats projecting below the skid.

To the rear cross shaft 30 another similar pair of hangers 38 are mounted, and these may be pivotally supported on the cross shaft 30. These hangers support the U-shaped cross bar 39, through the vertical end arms 39a thereof, in the manner previously disclosed, with reference to the cross bar 33. The cross shaft or bar 39 is pivotally connected to the rear end portion of the skid by means of the clamp straps 40. The distance between the rear end of the skid and the cross shaft 30 is slightly greater than the distance between the forward end of the skid and the cross shaft 26, so that when the skid is in its lower or braking position the rear end of the skid will have greater bearing engagement or penetration with the snow covered road, than the forward end of the skid, and the rear end of the skid will engage the snow covered road in advance of the engagement of the forward end of the skid therewith.

Figure 3:
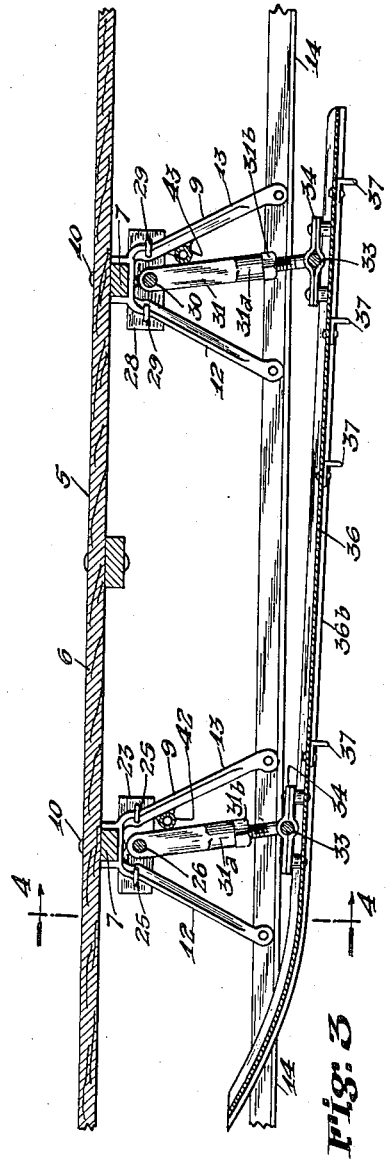
Fig. 3 is a longitudinal sectional view, taken on line 3—3 of Fig. 2, looking in the direction of the arrows.
Figure 4:
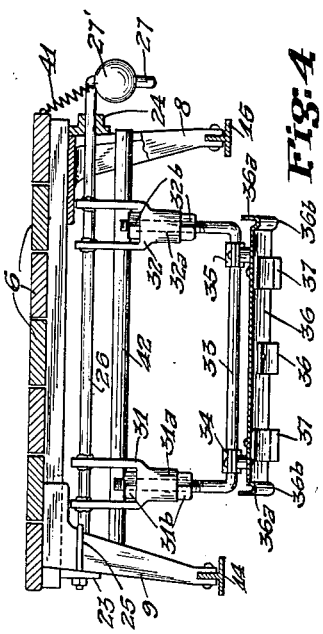
Fig. 4 is a transverse sectional view, taken on line 4—4 of Fig. 3, looking in the direction of the arrows.

The skid is held normally elevated between the runners of the sled by the pull coil spring 41. In its lower position the skid is prevented from rising as it swings downwardly by the cross shafts 42 and 43, which are mounted on the brackets which support the cross rods 26 and 30. These cross rods or shafts 42 and 43 are engaged by the hangers, which support the skid, as shown in Fig. 3.

The resistance of the bottom face of the skid may be reduced or increased by the number of cleats or obstacles secured to the skid. When the skid is lowered the spring 41 will exert a pull to hold the skid in its braking position, due to the fact that the spring will be forced into a corresponding angular position, to the forward and downward angular position shown in Fig. 3, with the exception that in the braking position the spring will extend rearwardly and downwardly.

The braking action is developed by the rider of the sled forcing the handle 27 forwardly and downwardly. This action overcomes the tension of the pull spring, and swings the forward shaft so that the hangers mounted thereon are forced downwardly, thus forcing the skid against the snow covered ground or roadway. Due to the greater length of the rear hangers the rear end of the skid will engage the snow covered road first, and due to the obstacle cleats on the skid the effect of the forward motion or momentum of the skid will be to force the skid more deeply under greater pressure against the ground or road, and as this action develops the entire sled will be elevated above the roadway.

In practical road tests it has been found that the sled can be stopped when moving at a speed of approximately twenty-five miles an hour, down hill, within an amazingly short distance of a few feet, and that the braking action does not result in any tendency to upset the passenger.

After the braking skid is released by the passenger or rider of the sled, the braking action develops under the force of the momentum of the moving sled. As soon as the hangers assume a rearwardly inclined position the sled is safely disengaged from direct sliding engagement with the road, and further sliding is prevented, regardless of the incline of the hill.

Figures 5, 6:
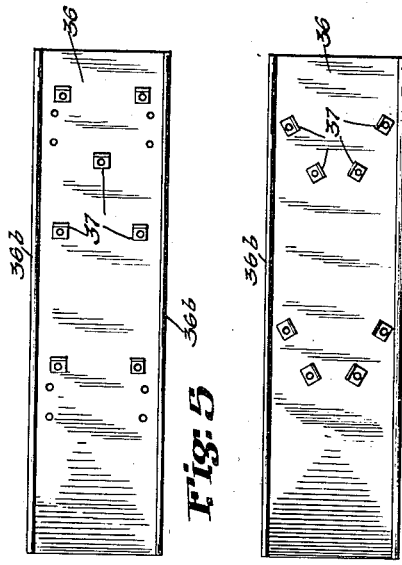
Fig. 5 is a detail bottom plan view of the skid.
Fig. 6 is another detailed bottom plan view of the skid.

The obstacle cleats of the skid may be arranged in converging rows, as shown in Fig. 6, located either as shown, or in reverse order; that is, either to cause the snow to pile up under the skid, or to spread the snow laterally of the skid as it plows through the snow.

The width of the skid is several times that of the combined widths of the sled runners, so that it is not possible for the skid to sink into the snow deeper than the runners do.

Having described my invention I claim as new:

1. A gravity actuated sled having base runners and a braking skid mounted between the runners and having a bearing surface exceeding that of the runners, said skid being pivotally supported on the sled to normally be out of engagement with the road when the runners are engaged therewith and to be forced rearwardly when released from the normal position to engage the road commencing at one end thereof to disengage the runners from the road.

2. A sled having side runners, a pair of shafts mounted on the sled and spaced longitudinally from each other, a skid located between the runners, a hanger pivotally connecting the forward end of the skid to the forward shaft, a hanger pivotally connecting the rear end of the skid to the other shaft, the lengths of the hangers being such that the plane of the skid is angularly disposed relative to the plane of the runners, and obstacles arranged on the bottom face of the skid.

3. A sled having side runners, a shaft located on the sled near one end thereof, a shaft located distantly thereof, one of said shafts having a crank handle connected thereto, means for holding the shaft in one position under spring tension, a hanger mounted on each shaft, one of said hangers being longer than the other hanger, and a road engaging braking skid connected to the hangers.

4. A sled having side runners, a shaft located on the sled near one end thereof, another shaft located distantly thereof, a road engaging skid arranged between the runners, and means for supporting the skid on the shafts so that the rear end of the skid will engage the road in advance of the forward end of the skid.

5. A sled having side runners, a shaft located on the sled near one end thereof, another shaft located distantly thereof on the sled, a road engaging skid having cleats on the bottom face thereof, means for supporting the skid on the shafts so that one end of the skid will engage the road in advance of the other end of the skid, and means for manually shifting the skid to cause the skid to engage the road and brake the forward movement of the sled when the latter is in motion.

6. The combination set forth in claim 5, including a spring arranged to maintain the skid normally elevated and adapted to be actuated by the manual operation of the last named means to hold the skid in braking position, also including means for limiting the movement of the skid in braking position.

7. A sled consisting of a deck, a pair of longitudinal runners, connections between the runners and the deck for supporting the deck above the runners, a shaft mounted to turn under the deck near one end thereof, another shaft mounted to turn under the deck near the rear end thereof, one of said shafts having a crank for manually turning the same, hangers supported on the first shaft, a U-shaped cross bar adjustably secured on the hangers, hangers supported on the second named shaft, a U-shaped bar adjustably connected to said last named hangers, a braking skid located between the runners, and means pivotally connecting the braking skid to the U-shaped bars, said skid having projections on its bottom surface, the adjustment of the second named hangers being such that the rear end of the skid will initially engage the ground to raise the rear end of the sled in advance of the forward end.

8. The construction set forth in claim 7, including stops for limiting the rearward movement of the hangers.

9. In combination with a sled having runners engaging a riding surface, a skid, and means for pivotally supporting the skid on the sled so that the skid is gradually applied along its length to the riding surface solely by the momentum of the sled to disengage the runners therefrom.

10. In combination with a sled having runners engaging a riding surface, a skid, and means for supporting the skid on the sled in angular relation with respect to the plane of the riding surface so that the skid is rendered effective in a stepped manner along the plane of the riding surface solely by the momentum of the sled to disengage the runners therefrom.

11. In combination with a sled having runners engaging a riding surface, braking means, and means for pivotally supporting the braking means on the sled so that the braking means is gradually rendered effective along its length solely by the momentum of the sled.

12. In combination with a sled having runners engaging a riding surface, braking means substantially coextensive with the runners, and means for so supporting the braking means on the sled that the rearward end of the braking means engages the riding surface in advance of the forward end thereof.

13. In combination with a sled having runners engaging a riding surface, braking means substantially coextensive with the runners, and means for so supporting the braking means on the sled that the rearward end of the braking means initially engages the riding surface, further engagement between the braking means and the riding surface being effected along the longitudinal plane of the runners by the momentum of the sled.

14. In combination with a sled having runners engaging a riding surface, means for displacing the runners including a member angularly disposed relative to the plane of the riding surface, the member being actuated from one end thereof by the momentum of the sled to gradually engage the riding surface in a stepped manner to displace the runners therefrom.

15. In combination with a sled having runners engaging a riding surface, means for overcoming the effectiveness of the runners comprising a member substantially coextensive with the runners, and means for so supporting the member on the sled that initially a rearward portion thereof engages the riding surface, further engagement of the member and the riding surface being effected in a stepped manner along the longitudinal plane of the runners by the momentum of the sled to disengage the runners from the riding surface thereby rendering the latter ineffective.

ROBERT N. BRICKNER.